United States Patent [19]

Nakamura et al.

[11] Patent Number: 4,829,226
[45] Date of Patent: May 9, 1989

[54] RECHARGEABLE BATTERY PACK AND CHARGER UNIT COMBINATION

[75] Inventors: Katsuji Nakamura, Hikone; Masami Kitamura, Kanzaki; Kouichi Iwanaga, Hikone, all of Japan

[73] Assignee: Matsushita Electric Works, Ltd., Kadoma, Japan

[21] Appl. No.: 207,828

[22] Filed: Jun. 17, 1988

[30] Foreign Application Priority Data

Sep. 16, 1987 [JP] Japan .................. 62-153900

[51] Int. Cl.⁴ .................. H02J 7/04; H01M 10/44
[52] U.S. Cl. .................. 320/35; 320/2
[58] Field of Search .................. 320/2, 35, 36

[56] References Cited

U.S. PATENT DOCUMENTS

| | | | |
|---|---|---|---|
| 4,006,396 | 2/1977 | Bogut | 320/35 X |
| 4,006,397 | 2/1977 | Cattoti et al. | 320/35 X |
| 4,668,902 | 5/1987 | Zeller, Jr. | 320/35 X |
| 4,686,444 | 8/1987 | Park | 320/35 X |
| 4,727,006 | 2/1988 | Malinowski et al. | 320/35 X |

FOREIGN PATENT DOCUMENTS 56-48241  4/1981  Japan .

Primary Examiner—R. J. Hickey
Attorney, Agent, or Firm—Armstrong, Nikaido, Marmelstein, Kubovcik & Murray

[57] ABSTRACT

A battery pack containing a rechargeable battery is detachable to a charger unit for charging under the control of a charging circuit in the charger unit. The battery pack includes a sensor output circuit which comprises a temperature sensor for sensing the temperature of the battery being charged. A voltage dividing resistor network is formed in the sensor output circuit and receives a constant current from the charging circuit upon attachment of the battery pack to the charger unit such that it provides an enable signal of a first voltage level to the charging circuit for allowing the charging of the battery at a first charge rate so long as the sensed battery temperature is below a predetermined reference level. When the sensed battery temperature exceeds the reference level, the voltage dividing resistor network responds to provide a stop signal of a second voltage level for inhibiting the charging at the first charge rate. Also included in the sensor output circuit is a hold circuit which holds to provide the stop signal to the charging circuit once the sensed temperature exceeds the reference level.

4 Claims, 5 Drawing Sheets

RECHARGEABLE BATTERY PACK AND CHARGER UNIT COMBINATION

BACKGROUND OF THE INVENTION

1. Field of the Invention

The present invention is directed to a rechargeable battery pack and charger unit combination.

2. Background Art

Such combination of a rechargeable battery pack and a charger unit has been widely utilized for power driven devices such as screwdrivers or the like portable tools. The charger unit includes a charging circuit which is controlled to supply a charge current to the rechargeable battery in the battery pack until the battery is fully charged. For a certain type of the rechargeable battery, it has been a practice to monitor the temperature of the battery being charged as an effective parameter indicating the terminal voltage of the battery in order to control the charging circuit. To this end, a temperature sensor is included in the battery pack for transmitting a sensor output indicative of the battery temperature, or the charge condition of the battery to the charging circuit for control thereof. As disclosed in the Japanese Utility Model Publication (KOKAI) No. 56-48241 published on Apr. 28, 1981, a prior charge control scheme based upon the battery temperature requires in the charger circuit a judge-and-hold circuit which judges from the output of the temperature sensor that the battery temperature or the terminal voltage exceeds a predetermined critical level to be indicative of the battery being fully charged, and which holds the charger circuit in an OFF condition of supplying no charging current to the battery once the fully charged condition is judged for prevention of the overcharging which would otherwise result as the battery temperature falls below the critical reference level.

In the meanwhile, there have been proposed in the art a wide variety of battery packs with rechargeable batteries of different voltage-temperature characteristics. In this connection, it is required to use different temperature sensors particularly compatible with the kinds of the rechargeable batteries selected for providing a reliable sensor output well indicative of the fully charged condition of the rechargeable battery. This means that the temperature sensors with the outputs of differing levels are used within the battery packs of different types. If this is the case, the charger unit is also required to incorporate the judge-and-hold circuit which is particularly designed in exact correspondence with the output level of the sensor selected in the particular battery pack. With this result, different types of the charger units may be required for different types of the battery packs. This is not economical in view of that different types of battery packs may be required for different power operated devices but a single type of the charger unit is enough for charging. Therefore, it is highly desired to utilize the battery charger common to the different types of the battery packs utilizing different temperature sensors.

SUMMARY OF THE INVENTION

The above problem has been eliminated in the present invention which utilizes a battery pack capable of providing outputs of different adjustable voltage levels in response to the sensed battery temperature. In the battery pack and charger unit combination in accordance with the present invention, the battery pack accommodating a rechargeable battery is detachable to the charger unit including a charging circuit for charging the rechargeable battery. Included in the battery pack is a sensor output circuit which comprises temperature sensor means for sensing the battery temperature and a voltage dividing resistor network connected to receive a constant current from said charging circuit. The voltage dividing resistor network is cooperative with the temperature sensor means to provide an enable signal of a first voltage level to the charging circuit for allowing the charging of the rechargeable battery at a first charge rate when the sensed battery temperature is below a predetermined reference level and to provide a stop signal of a second voltage level to the charging circuit for inhibiting the charging at the first charge rate when the sensed battery temperature exceeds said reference level. Also included in the sensor output circuit is a hold circuit which holds the voltage dividing network to provide the stop signal once the battery temperature exceeds the reference voltage for preventing the battery from being overcharged. Thus, the battery pack can provide the enable and stop signals of which voltage levels can be adjusted through the voltage dividing resistor network to desired levels acceptable by the charging circuit in the charger unit for control of the charging circuit. With this result, it is possible to use the charging circuit or the charger unit common to differing types of the battery packs utilizing particular temperature sensors having different sensor output levels for indication of the fully charged condition.

Accordingly, it is a primary object of the present invention to provide a battery pack and charger unit combination which allows the use of the charger unit common to the different types of the battery packs, while effecting controlled charging based upon the battery temperature.

The battery pack is provided with a pair of charge terminals and a control terminal which come into electrical connection with the charging circuit through respective contacts provided at said charger unit when said battery pack is attached to said charger unit. The pair of charge terminals is used for passing therethrough a charge current from the charging circuit to the rechargeable battery, while the control terminal is cooperative with one of the charge terminals to feed the enable and stop signals from the sensor output circuit to the charging circuit. In a preferred embodiment, the temperature sensor is a thermoswitch which is kept closed so long as the sensed battery temperature is below the predetermined reference level and is caused to open when the sensed temperature exceeds the reference temperature level. The thermoswitch is inserted in the sensor output circuit in series connection with a first resistor and a second resistor. The series combination of the thermoswitch, the first and second resistors is connected across the control terminal and the one of the charge terminals. Also included in the sensor output circuit is a pair of first and second transistors having their respective emitter-base paths connected in series circuit in parallel relation to the series combination of the thermoswitch and the second resistors. A third resistor is connected in series relation with the thermoswitch between the base-emitter path of the second transistor. The pair of first and second transistors define the holding means and the first and second resistors define the voltage dividing resistor network. With this circuit configuration, when the thermoswitch is kept closed as a result of the battery temperature remains below the reference level, the constant current fed from the charging circuit flows through the first and second resistors to provide the enable signal of the first voltage as a function of the total resistance of the first and second resistors. When the thermoswitch is opened in response to the battery temperature exceeding the reference level, the second transistor is biased through the third resistor to become conductive which in turn makes the first transistor conductive for passing the constant current through the base-emitter paths of the first and second transistors so as to provide the stop signal of the second voltage as a function of substantially only the first resistor. Therefore, the first and second voltage can be adjusted to desired levels by suitably selecting the first and second resistors, which is another object of the present invention.

The rechargeable battery is preferably composed of a plurality of cylindrical cells at least three of which are packed together in parallel relation so as to leave between the adjacent rounded side surfaces a space for receiving therein the thermoswitch. Thus, the thermoswitch can be held in close proximity to each cell for obtaining enhanced sensitivity while effectively utilizing the space inherently formed between the cells for accommodating the thermoswitch.

It is therefore a further object of the present invention to provide a battery pack and charger combination in which the temperature sensor can be located within the battery back at a position effective for reliable battery temperature sensing and space utilization.

These and the other objects and advantages of the present invention will become more apparent from the following description of the preferred embodiment of the present invention when taken in conjunction with the accompany drawings.

DESCRIPTION OF THE PREFERRED EMBODIMENT

Figure 1:
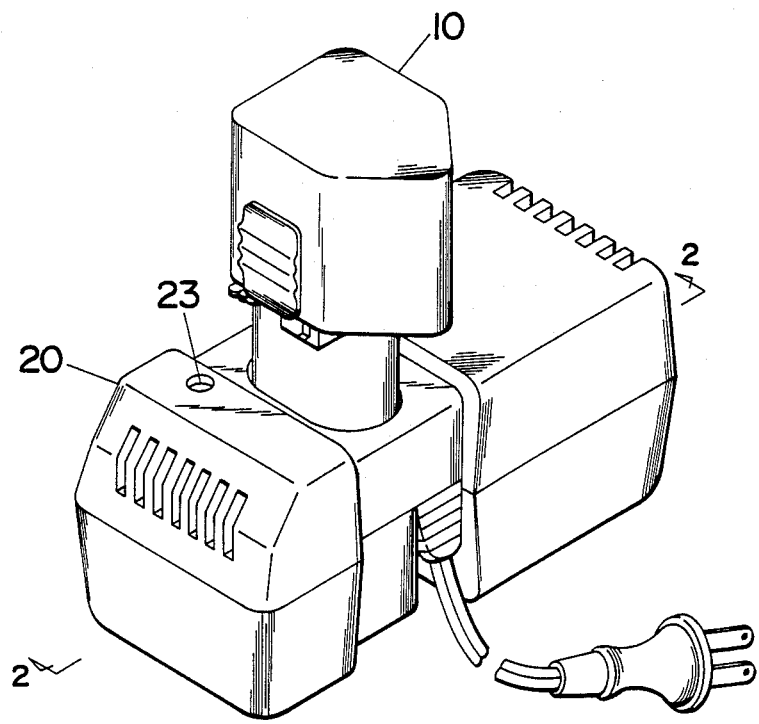
FIG. 1 is a perspective view of a battery pack and a charger unit, shown in a connected position, in accordance with a preferred embodiment of the present invention.
Figure 2:
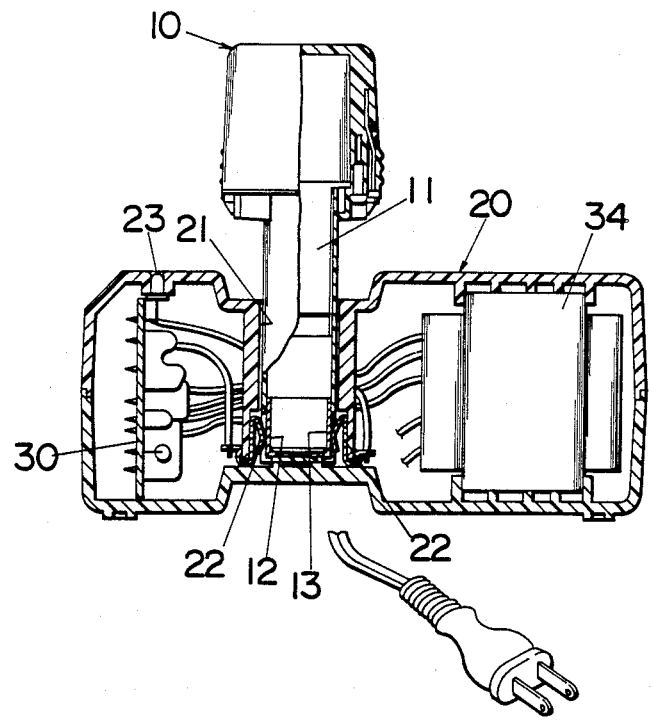
FIG. 2 is a sectional view of the charger unit taken along line 2—2 of FIG. 1 with the battery pack shown partly in section.
Figure 3:
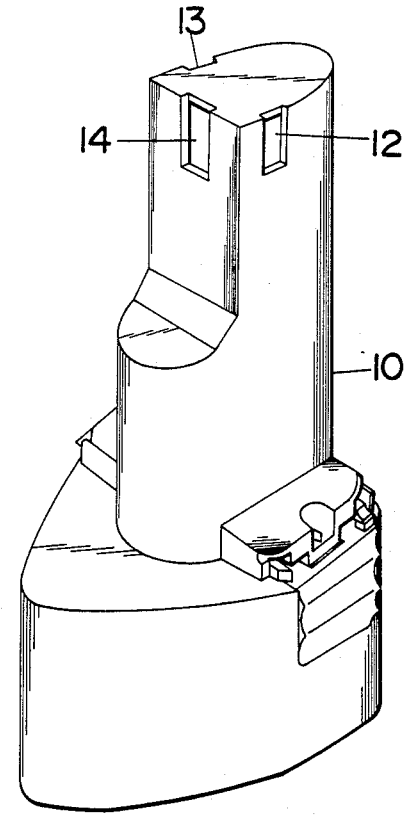
FIG. 3 is a perspective view of the battery pack.

Referring to FIGS. 1 to 3, there is shown a combination battery pack and charger unit in accordance with a preferred embodiment of the present invention. The battery pack 10 accommodates a rechargeable battery 11 and is adapted in use to be inserted in a power operated electrical device such as a portable screwdriver or the like power tools for energizing the device. The battery pack 10 is provided at its one end with a pair of charge terminals 12 and 13 through which a current is supplied to the device. When recharging is necessary, one end of the battery pack 10 is inserted in a slot 21 of the charger unit 20 for connection of the rechargeable battery 11 with a charging circuit 30 formed in the charger unit 20. The battery pack 10 is also formed with a control terminal 14 for providing to the charging circuit 30 a signal indicative of the battery temperature which is in turn indicative of the terminal voltage of the battery 11 being charged. These terminals 12 to 14 are respectively engaged with corresponding contacts 22 at the bottom of the slot 21 of the charger unit 20 for connection with the charging circuit 30.

Figure 6:
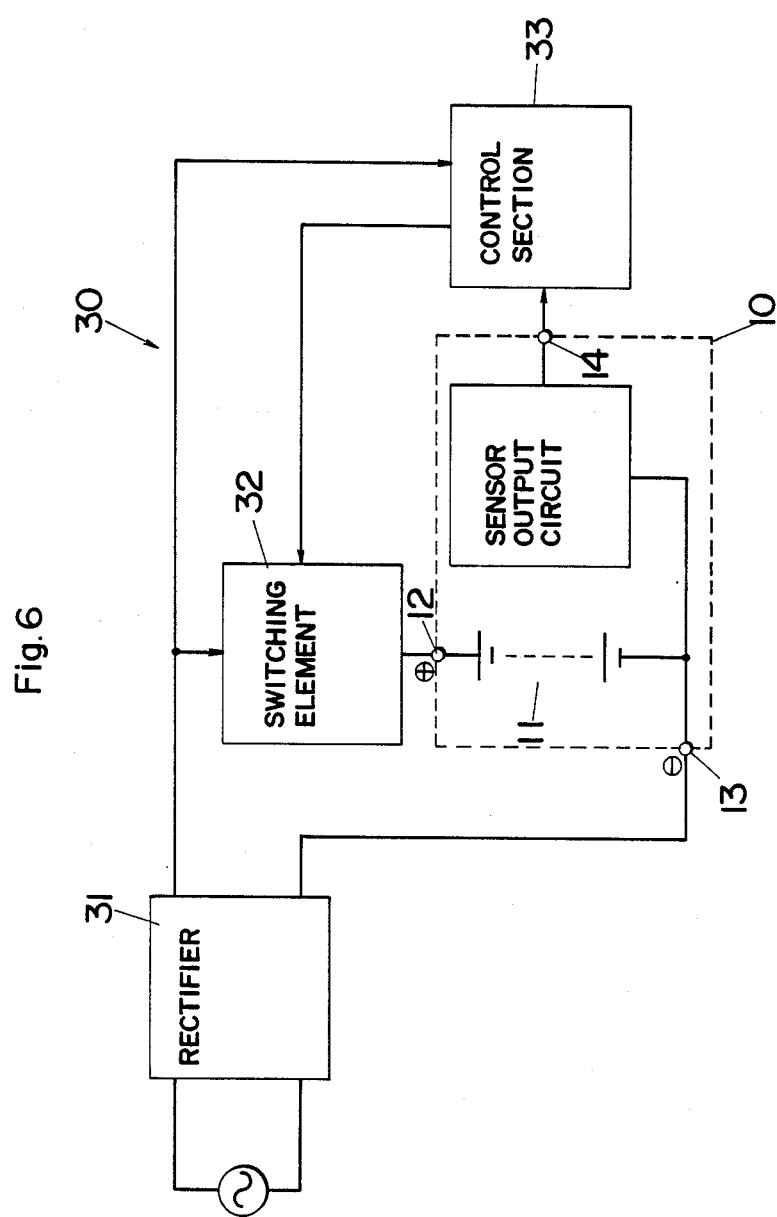
FIG. 6 is a block diagram showing the circuit of a charging circuit of the charger unit.

The charging circuit 30 comprises, as shown in FIG. 6, a rectifier 31, a switching element 32, and a control section 33. The rectifier 31, which is connected to a source of a.c. voltage, includes a step-down transformer 34 (only seen in FIG. 2) to provide a charge current to the rechargeable battery 11 by way of the switching element 32. The control section 33 receives from the battery pack 10 the signal indicative of the battery temperature so as to thereby control the switching element 32 in such a manner as to effect the charging at a fist charge rate (i.e., supply a larger charging current) and effect the charging at the second rate (i.e., supply a minute charge current or no current), selectively depending upon the level of the battery temperature. After the first rate charging is completed, the control section 33 causes an indicator lamp 23 (seen in FIGS. 1 and 2) to turn on for indication that the battery is fully charged.

Figure 5:
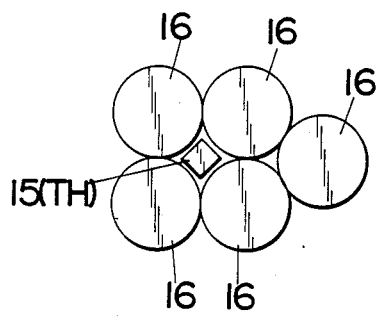
FIG. 5 is a schematic view of the cell arrangement of the rechargeable battery within the battery pack.
Figure 4:
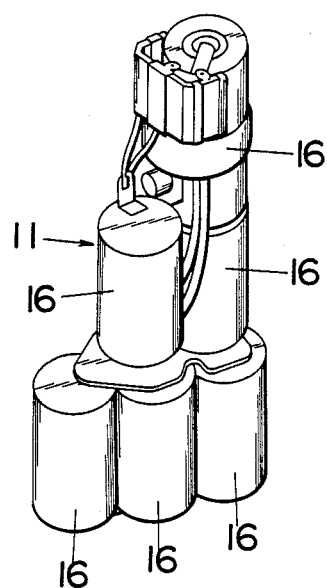
FIG. 4 is a perspective view of a rechargeable battery accommodated in the battery pack.

The battery pack 10 includes a temperature sensor 15 which senses the temperature of the rechargeable battery being charged as indicative of the battery condition. In the present embodiment, a thermoswitch TH is employed as the temperature sensor which has its contact opened when the battery temperature is sensed to exceed a predetermined reference level which is indicative of the battery being fully charged. The thermoswitch TH has its contact kept closed so long as the battery temperature is below the reference temperature level. The rechargeable battery 11 is composed of eight cylindrical cells 16 disposed within the battery pack 10 in a manner as shown in FIG. 4. The bottom five cells 16 are closely packed in parallel relation as shown in FIG. 5 so as to leave between the four adjacent cells 16 a confined space S for receiving the temperature sensor 15 or thermoswitch TH. Thus, the thermoswitch TH can be held in close proximity to the cells for ensuring improved sensitivity against the battery temperature while effectively utilizing the space inherently formed between the adjacent cells 16. Such confined space is always formed between at least three cells when packed in parallel relation to each other.

Figure 7:
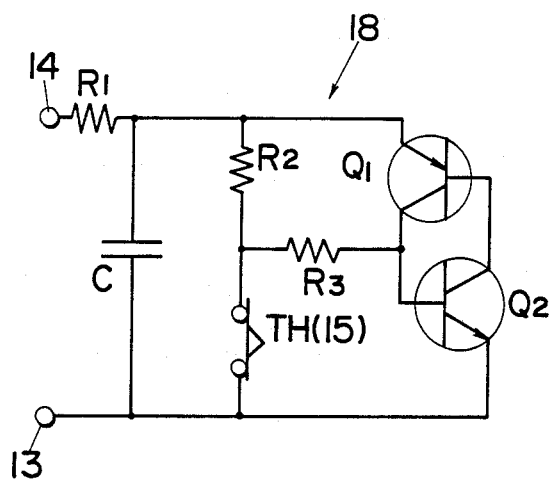
FIG. 7 is a circuit diagram of a sensor output circuit included in the battery pack.

Also provided in the battery pack 10 is a sensor output circuit 18 which is connected between the control terminal 14 and the negative charge terminal 13, as shown in FIG. 7. The sensor output circuit 18, which receives a constant current from the charging circuit 30 when the battery pack 10 is inserted in the charger unit 20, comprises in addition to the thermoswitch TH, a voltage dividing resistor network of a first resistor $R_1$ and a second resistor $R_2$; and a hold circuit of a first transistor $Q_1$ and a second transistor $Q_2$. The first and second resistor $R_1$ and $R_2$ are connected in series relation with the thermoswitch TH between the control terminal 14 and the negative terminal 13. The first and second transistors $Q_1$ and $Q_2$ have their respective base-emitter paths connected in series in a parallel relation to the series combination of the second resistor $R_2$ and the thermoswitch TH. A third resistor $R_3$ is connected in series with the thermoswitch TH between the base-emitter path of the second transistor $Q_2$. A capacitor C is also connected in parallel relation with the series combination of the second resistor $R_2$ and the thermoswitch TH for eliminating possible noises which may result from the chattering of the thermoswitch TH. In operation, so long as the thermoswitch TH is kept closed in response to the battery temperature being below the reference level, or the battery is not yet fully charged, the constant current I from the charging circuit 30 will flow through the first resistor $R_1$, the second resistor $R_2$, and the closed thermoswitch TH to shunt the base-emitter path of the transistor $Q_2$, thereby keeping the second transistor $Q_2$ and therefore the first transistor $Q_1$ nonconductive. Whereby there is developed across the control terminal 14 and the negative charge terminal 13 a voltage $V_{81}$ $[=I\times(R_1+R_2)]$, which is fed to the control section 33 of the charging circuit 30 as an enable signal for effecting the charging of the battery 11 at the first charge rate. When the thermoswitch TH is caused to be opened in response to the battery temperature exceeding the reference level, the current I will flow through the first, second and third resistors R1, R2, and R3 to bias the second transistor $Q_2$ conductive, which in turn biases the third transistor $Q_3$ conductive. Thus, the constant current I from the charging circuit 30 will flow through the first resistor $R_1$, the first transistor $Q_1$, and the second transistor $Q_2$ to develop across the control terminal 14 and the negative charge terminal 13 a voltage $V_{82}$ $[=I.R_3+V_{BE}$, wherein $V_{BE}$ is the base-emitter voltage of the first and second transistors $Q_1$ and $Q_2$], which is fed to the control section 33 of the charging circuit 30 as a stop signal for inhibiting the charging at the first rate or stopping the charge. Once the transistors $Q_1$ and $Q_2$ become conductive, they are latched in the conductive condition to hold the circuit to provide the stop signal even when the thermoswitch TH is again closed in response to the battery temperature falling below the reference level, preventing the overcharging of the battery. With the provision of the voltage dividing network in the sensor output circuit 18, the enable and stop signals developed across the control terminal 14 and the negative charge terminal 13 can be of any voltage level that matches with the requirement of the control section 33 of the charging circuit 30 by suitably selecting the values of the first and second resistors $R_1$ and $R_2$. Consequently, different types of battery packs, which utilize temperature sensors having the characteristics of producing differing output levels for indication of the battery condition, can be adjusted to provide the enable and stop signals of the same voltage level common to and therefore acceptable to a single type of the charger unit or the control section 33 of the charging circuit 30 therein. Such differing temperature sensors include, for example, a diode, thermistor, and posistor. The latching condition of the transistors $Q_1$ and $Q_2$ are reset when the battery pack 10 is detached from the charger unit 10 to disconnect the sensor output circuit 18 from the charging circuit 30. Although the thermoswitch TH is utilized as the temperature sensor in the above embodiment, it is equally possible to use the diode, thermistor, and posistor as the temperature sensor with suitable modification of the circuit.

What is claimed is:

1. A combination comprising a battery pack accommodating therein a rechargeable battery and a charger unit detachably receiving said battery pack, said charger unit including a charging circuit for charging said rechargeable battery, said battery pack including a sensor output circuit which comprises temperature sensor means for sensing the temperature of said rechargeable battery being charged, said sensor output circuit being cooperative with said temperature sensor means to provide an enable signal of a first voltage level to said charging circuit for allowing the charging of said rechargeable battery at a first charge rate when the sensed battery temperature is below a predetermined reference level and to provide a stop signal of a second voltage level to said charging circuit for inhibiting said charging at the first charge rate when the sensed battery temperature exceeds said reference level; said sensor output circuit further including hold means which holds the sensor output circuit to provide said stop signal to said charging circuit once the sensed battery temperature exceeds said reference level; and said battery pack having a pair of charge terminals and a control terminal which come into electrical connection with said charging circuit through respective contacts provided at said charger unit when said battery pack is attached to said charger unit, said pair of charge terminals passing therethrough a charge current from said charging circuit to said rechargeable battery, and said control terminal being cooperative with one of said charge terminals to feed said enable and stop signals from said sensor output circuit to said charging circuit.

2. A combination comprising a battery pack accommodating therein a rechargeable battery and a charger unit detachably receiving said battery pack, said charger unit including a charging circuit for charging said rechargeable battery, said battery pack including a sensor output circuit which comprises temperature sensor means for sensing the temperature of said rechargeable battery being charged and a voltage dividing resistor network connected to receive a constant current from said charging circuit, said voltage dividing resistor network being cooperative with the temperature sensor means to provide an enable signal of a first voltage level to said charging circuit for allowing the charging of said rechargeable battery at a first charge rate when the sensed battery temperature is below a predetermined reference level and to provide a stop signal of a second voltage level to said charging circuit for inhibiting said charging at the first charge rate when the sensed battery temperature exceeds said reference level; said sensor output circuit further including hold means which holds the sensor output circuit to provide said stop signal to said charging circuit once the sensed battery temperature exceeds said reference level; and said battery pack having a pair of charge terminals and a control terminal which come into electrical connection with said charging circuit through respective contacts provided at said charger unit when said battery pack is attached to said charger unit, said pair of charge terminals passing therethrough a charge current from said charging circuit to said rechargeable battery, and said control terminal being cooperative with one of said charge terminals to feed said enable and stop signals from said sensor output circuit to said charging circuit.

3. A combination as set forth in claim 2, wherein said temperature sensor is a thermoswitch which is closed when the sensed battery temperature is below said reference level and is opened when the sensed temperature exceeds said reference level, and wherein said sensor output circuit comprises a series combination of a first resistor, a second resistor and said thermoswitch connected across said control terminal and said one of the charge terminals, a pair of first and second transistors with their respective emitter-base paths connected in series circuit in parallel relation to the series combination of said second resistor and said thermoswitch, and a third resistor connected in series relation with said thermoswitch between the base-emitter path of said second transistor; whereby said pair of first and second transistor define said holding means and said first and second resistors define said voltage dividing resistor network.

4. A combination as set forth in claim 3, wherein said rechargeable battery is composed of three or more cylindrical cells at least three of which are packed together in parallel relation with their longitudinal axis in parallel relation to each other so as to leave between the adjacent rounded side surfaces a confined space for receiving therein said thermoswitch.

* * * * *